United States Patent [19]

Ammons

[11] 4,361,692

[45] Nov. 30, 1982

[54] EXTENDED POT LIFE POLYURETHANE

[75] Inventor: Vernon G. Ammons, Glenshaw, Pa.

[73] Assignee: PPG Industries, Inc., Pittsburgh, Pa.

[21] Appl. No.: 304,777

[22] Filed: Sep. 23, 1981

Related U.S. Application Data

[63] Continuation of Ser. No. 173,785, Jul. 30, 1980, abandoned.

[51] Int. Cl.$^3$ .................. C08G 18/30; C08G 18/08
[52] U.S. Cl. ............................. 528/51; 528/487; 528/72
[58] Field of Search ................. 528/51, 72, 487

[56] References Cited

U.S. PATENT DOCUMENTS

| | | | |
|---|---|---|---|
| 2,692,873 | 10/1954 | Langerak et al. | 260/77.5 |
| 3,179,625 | 4/1965 | Ehahart | 260/75 |
| 3,468,819 | 9/1969 | Szabat | 521/107 |
| 3,882,071 | 5/1975 | Olstowski et al. | 260/30.6 R |
| 3,900,686 | 8/1975 | Ammons et al. | 428/425 |
| 3,943,075 | 3/1976 | Fishbein et al. | 260/2.5 AW |
| 4,160,853 | 7/1979 | Ammons | 528/85 |

*Primary Examiner*—H. S. Cockeram
*Attorney, Agent, or Firm*—Donna L. Seidel

[57] ABSTRACT

The use of an organic phosphorus acid compound to extend the pot life of urethane reaction mixtures is disclosed.

10 Claims, No Drawings

EXTENDED POT LIFE POLYURETHANE

This is a continuation Ser. No. 173,785, filed July 30, 1980 and now abandoned.

BACKGROUND OF THE INVENTION

1. Field of the Invention

The present invention relates generally to the art of making urethane polymers and more particularly to the art of making urethane polymers suitable for fabrication by casting and molding at typical processing temperatures.

2. The Prior Art

In U.S. Pat. No. 3,882,071 Olstowski et al disclose adding organic phosphates as liquid modifiers to prmote rapid setting of nonelastomeric polyurethane compositions employing organometallic catalysts.

In U.S. Pat. No. 3,900,686 Ammons et al disclose the use of an organic phosphorus acid with an organic silane in a polyurethane composition to provide a controlled degree of adhesion of the polyurethane to glass, resulting in a safety laminate with improved penetration resistance.

SUMMARY OF THE INVENTION

The present invention involves the use of small amounts of an organic phosphorus acid compound in a reaction mixture comprising an organic isocyanate and a compound containing isocyanate-reactive hydrogen to increase the pot life of the reaction mixture at typical processing and handling temperatures without substantially affecting the cure at higher temperatures.

DESCRIPTION OF THE PREFERRED EMBODIMENT

Polyurethane compositions which have an extended pot life in accordance with the present invention may be broadly defined as consisting essentially of an organic polyisocyanate, an organic compound having at least two hydrogen moieties capable of reacting with the isocyanate to form polyurethane linkages, and an organic phosphorus acid compound which renders the reaction mixture substantially less reactive at typical processing temperatures while not significantly altering the reactivity at typical curing temperatures. Polyurethane reaction mixtures which may be treated with an organic phosphorus acid compound according to the present invention are described in U.S. Pat. Nos. 4,024,113; 4,101,529; 4,131,605; 4,131,606 and 4,160,853; and U.S. Pat. No. 4,241,140, the disclosures of which are incorporated herein by reference.

The organic polyisocyanate component should preferably be an organic diisocyanate. In some applications, such as trilayer laminates, aromatic isocyanates may be used with economic advantage. A preferred aromatic diisocyanate is toluene diisocyanate. However, cycloaliphatic diisocyanates are preferred since they are not adversely affected by ultraviolet light and have high impact energy absorption levels making them particularly desirable for bilayer safety glass applications. In addition, polyurethanes prepared with cycloaliphatic diisocyanates are not adversely affected by conventional processing temperatures. Polyurethanes made with analogous aromatic diisocyanates, such as toluene diisocyanate and methylene diphenyl diisocyanate, do not normally have as good impact energy absorption levels, are subject to ultraviolet light deterioration, and also are not as thermally stable as comparable polyurethanes made with cycloaliphatic diisocyanates. A preferred cycloaliphatic diisocyanate is 4,4'-methylene-bis-(cyclohexyl isocyanate) commercially available from E. I. duPont de Nemours Company under the trademark HYLENE W.

In addition to the preferred 4,4'-methylene-bis-(cyclohexyl isocyanate), other dinuclear cyclic aliphatic diisocyanates which are preferred are those formed through an alkylene group of from 1 to 3 carbon atoms, inclusive, and which can be substituted with nitro, chloro, alkyl, alkoxy and other groups which are not reactive with hydroxyl groups (or active hydrogens) provided they are not positioned to render the isocyanate group unreactive. Another example of a preferred dinuclear cycloaliphatic diisocyanate is 4,4'-isopropylidene-bis-(cyclohexyl isocyanate). An example of a preferred mononuclear cyclic aliphatic diisocyanate is 1,4-cyclohexyl diisocyanate. Hydrogenated aromatic diisocyanates such as hydrogenated toluene diisocyanate as well as dinuclear diisocyanates in which one of the rings is saturated and the other unsaturated can also be employed. Mixtures of cyclic aliphatic diisocyanates with straight chain aliphatic diisocyanates and/or aromatic diisocyanates can also be employed. Thioisocyanates corresponding to the above diisocyanates can be employed as well as mixed compounds containing both an isocyanate and a thioisocyanate group.

In addition to the most preferred cyclic aliphatic diisocyanates, straight chain aliphatic diisocyanates such as 1,4-tetramethylene diisocyanate, 1,6-hexamethylene diisocyanate, 1,10-decamethylene diisocyanate, and hexamethylene adipamide diisocyanate can be employed. Suitable aromatic diisocyanates, although not preferred, can be employed and include mononuclear types such as 2,4-toluene diisocyanate, 2,6-toluene diisocyanate, and commercial mixtures comprising 80 percent 2,4-toluene diisocyanate and 20 percent 2,6 toluene diisocyanate, as well as 65/35 mixtures; and metaphenylene diisocyanate; diclunear aromatic diisocyanates such as 4,4'-diphenylene diisocyanate and 1,5-naphthalene diisocyanate; halogenated substituted aromatic diisocyanates such as 4-chloro-1,-3-phenylene diisocyanate; alkyl substituted diisocyanates such as 3,3'-dimethyl 4,4'-diphenylene diisocyanate, xylene diisocyanates including 1,3-xylene diisocyanate and 1,4-xylene diisocyanate and the durene isocyanates such as 2,3,5,6-tetramethyl-1,4-diisocyanate; aromatic-cycloaliphatic diisocyanates such as 1,5-tetrahydronaphthalene diisocyanate; polynuclear aromatic diisocyanates bridging through aliphatic groups such as diphenyl methane diisocyanate and diphenyl isopropylidene diisocyanate; alkoxy substituted aromatic diisocyanates such as dianisidine diisocyanates; mononuclear aralkyl diisocyanates such as xylene diisocyanates; aliphatic branched chain diisocyanates such as 2,2,4-trimethylhexamethylene diisocyanate; and ester containing aliphatic diisocyanates such as 2,6-diisocyanato methyl caproate (Lysine diisocyanate). In addition, sterically hindered compounds wherein the isocyanate groups differ in reactivity such as 2,4-diethylmethylene-bis-(4-phenylene isocyanate); 3-isocyanato methyl-3,5,5'trimethylcyclohexyl diisocyanate and 2,6-diethyl-1,4-phenylene diisocyanate may also be employed. In addition, diisocyanates bonded from sulfonyl groups such as 1,3-phenylene disulfonyl diisocyanate and 1,4-xylene disulfonyl diisocyanate may be used.

The polyisocyanates as described above are reacted with at least one compound containing at least two groups which are reactive with the isocyanate group. The preferred compounds are those which have at least two, preferably only two, active hydrogens per molecule, such as polyols and polyamines, preferably diols.

Suitable polyols include long chain diols such as polyester diols, polycarbonate diols and polyether diols. Representative of the polyether diols are the poly (oxypolymethylene) glycols which include those of the formula:

$$H + O(CH_2)_n \frac{1}{m} OH$$

where n is preferably from 3 to 6 and m can be varied considerably, e.g. from 2 to 30 or higher, preferably being between about 6 and about 20. Included are poly (oxytetramethylene) glycols, which are preferred, and poly (oxytrimethylene) glycols, as well as poly (oxypentamethylene) glycols, and poly(oxyhexamethylene) glycols. The poly(oxypolymethylene) should have a number average molecular weight between about 500 and 5000, preferably about 500 to 2000. The polyethers can be prepared by ring opening and polymerizing cyclic ethers with minor amounts of water.

The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably from 4 to 8, carbon atoms, examples of which are adipic, succinic, glutaric, palmitic, suberic, azelaic and sebacic radicals. Suitable aliphatic diols contain from 2 to 15 carbon atoms, examples of which are ethylene glycol, 1,3-propanediol, 1,4-butanediol and 1,6-hexanediol. The number average molecular weight of the polyester diol prepared from aliphatic diols and carboxylic acids should be between about 500 and about 5000, preferably about 500 to 2000.

Polyester diols can also be made from the polymerization of lactone monomers. Polyester polyols from caprolactone can be prepared by subjecting a lactone represented by the formula:

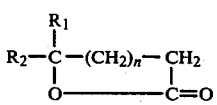

wherein $R_1$ and $R_2$ are each hydrogen or an alkyl of 1 to 10 carbon atoms, and n is an integer from 1 to 3, to polymerization in the presence of water or minor amounts of a low molecular weight glycol such as ethylen glycol, diethylene glycol, triethylene glycol, 1,4-butanediol, propylene glycol, 1,6-hexanadiol, glycerine, etc. The ring opening in polymerization is generally effected at a temperature between about 50° C. and 300° C., and preferably in the presence of a catalyst. Preparation of polycaprolactones is well known in the polyester art. Suitable caprolactones include gamma-, delta-and epsilon-caprolactones; monoalkyl, for example, methyl and ethylepsiloncaprolactones, dialkyl, for example dimethyl and diethylepsilon-caprolactones, cyclohexylepsilon-caprolactones, etc. The preferred lactone is epsiloncaprolactone.

The number average molecular weight of polyesters prepared from polycaprolactone diols should be between about 500 and 5000, preferably about 500 to 2000.

The above described polyesters can be represented by the following formulas:

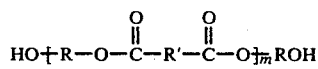

wherein R is the alkylene portion of the glycol used to prepare the polyester, R' is the alkylene portion of the dicarboxylic acid, and m is a number that ranges to about 15 or more. Thus, the polyester will be composed of a normal distribution of molecules with a predominant number of molecules represented by those when m varies from 1 to 4.

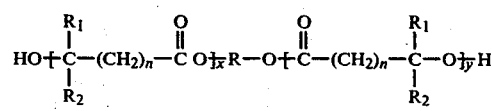

In the second formula presented above which represents polycaprolactones, n is an integer of from 1 to 4, $R_1$ and $R_2$ are each hydrogen or $C_1$ to $C_{10}$ alkyl, preferably $C_1$–$C_4$ alkyl, R is the alkylene portion of the glycol used to ring open the lactone and x plus y is a number that ranges up to 30 or more, but x and y are not simultaneously 0, with a predominant molecular species represented by those wherein x plus y ranges from 1 to 8 and the most predominant being x plus y ranging from 3 to 6.

Besides polyether and polyester diols, poly(alkylenecarbonate) diols such as poly(1,6-hexylenecarbonate) diol can be used. The preparation of the poly(alkylenecarbonate)diols can be carried out by reacting an aliphatic diol with phosgene, with a chloroformic acid ester; with a diaryl carbonate such as diphenyl carbonate, ditolyl carbonate, or dinaphthyl carbonate; or with a di-lower alkyl carbonate such as dimethyl, diethyl, or di-n-butyl carbonate, either by heating the reactants alone or with the use of an ester interchange catalyst depending on the identity of the reactants. Polycarbonates of different higher molecular weights are obtained depending on the proportions of reactants used. When carbonate ester reagents are used, a calculated quantity of the by-product monohydroxy compound is removed by distillation. Suitable alkylene diols include linear aliphatic diols having from about 4 to 10 carbon atoms such as 1,4-butanediol, 1,6-hexanediol and 1,10-decanediol, with 1,6-hexanediol being preferred. Poly(alkylenecarbonate) diols having number average molecular weights from 300 to 5000 are suitable, with a 300 to 2000 molecular weight range being preferred.

In synthesizing the polyurethanes, chain extension can be accomplished with a compound having two active hydrogens per molecule. The resulting polyurethanes have thermoplastic properties. Preferred chain extenders are aliphatic diols having a molecular weight below 250, and from 2 to 15 carbon atoms, such as ethylene glycol, 1,3-propanediol, 1,4-butanediol and 1,6-hexanediol.

The organic phosphorus acids useful in the practice of this invention have the following general structural formulae:

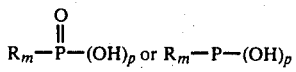

wherein R is an organic radical and m and p are integers of from 1 to 2 and m plus p must equal 3. Although the formulae above indicate that the acidic hydrogen is connected to the phosphorus atom through an oxygen linkage, a sulfur linkage may also be suitable. The term "organic radical" is intended to include moieties in which a carbon atom is linked directly to the phosphorus atom or linked via an oxygen atom. The organic radical R can include an alkyl, aryl, or alkaryl group or an alkoxy, aryloxy, or alkaryloxy group. Further, the organic radical can be substituted with groups such as nitro, halo, alkyl and alkoxy groups that do not detrimentally affect the polyurethane or the resultant laminates prepared therefrom, such as by loss of optical quality or other physicaal properties which contribute to the impact performance. When m is greater than 1 in the above structural formulae, the organic radicals can be the same or different. Typical classes of compounds encompassed within the above structural formulae are phosphonic acids, phosphonous acids, phosphinous acids and organic acidic phosphorus esters which include phosphates, phosphites and phosphonates. More specifically, such compounds include primary phosphonic acids, $ROP(O)(OH)_2$; secondary phosphonic acids, $R_2P(O)OH$; phosphonous acids, $RPO_2H_2$; phosphinous acids, $R_2POH$; primary phosphites, $ROPO_2H_2$; secondary phosphites, $(RO)_2POH$; primary phosphates, $ROP(O)(OH)$; and secondary phosphates, $(RO)_2 P(O)OH$. A comprehensive listing of useful organic phosphorous acid compounds is found in U.S. Pat. No. 3,900,686 which disclosure is incorporated herein by reference. Also, in the practice of the present invention, mixtures of various organic phosphorus acids can be used.

The molecular weight of the organic phosphorus acids should be at least about 96, preferably about 209 to 461. The preferred organic phosphorus acids are alkyl acid phosphates in which the alkyl group contains from 1 to 18 carbon atoms, e.g. methyl acid phosphate, 2-ethylhexyl acid phosphate, lauryl acid phosphate and stearyl acid phosphate, with stearyl acid phosphate and lauryl acid phosphate being preferred. Commercially available alkyl acid phosphates are mixtures of monoalkyl acid phosphate and dialkyl acid phosphate. These mixtures are called alkyl acid phosphates. The alkyl acid phosphates usually contain small quantities of condensed phosphates such as pyro- and polyphosphates, along with the mono-and dialkyl orthophosphates. There are also small amounts of free alcohol and phosphoric acid present. Preferably the alkyl groups in the alkyl acid phosphates contain greater than 6 and preferably from about 8 to 18 carbon atoms.

Preferred concentrations of the organic phosphorus acid compound range from about 0.01 to about 0.5 percent by weight of the polyurethane reaction mixture. Lower concentrations extend the pot life less substantially, while higher concentrations tend to compromise the quality of the polyurethane. Preferably the concentration of the organic phosphorus acid compound is between about 0.05 and 0.3 percent, more preferably about 0.1 to 0.2 percent. The organic phosphorous acid compound is preferably blended into the isocyanate component prior to addition of the reactive hydrogen compound to form the polyurethane reaction mixture.

The organic phosphorous acid compound is believed to form a low reactivity complex at typical processing temperatures, while at higher temperatures the catalyst is free to form higher reactivity complexes. Because the organic acid phosphorus compound lowers the reactivity of the reaction mixture, larger batches of the reaction mixture may be prepared and numerous casting cells may be filled before the reaction mixture becomes too viscous to handle.

Casting may be accomplished by merely pouring the resin into a cell, but preferably casting is accomplished by pumping a metered quantity of liquid resin into an interlayer space. After the resinous interlayer has been cast, the cell is sealed and the resin is permitted to cure in place. The time and temperature of cure will be from about 230° to 290° F. for a time up to about 24 hours. If a catalyst is present in the polyurethane the cure time can be significantly reduced from 24 to less than about 6 to 8 hours. The curing times and temperatures are equivalent to the curing times and temperatures of a polyurethane composition without an organic phosphorus acid compound additive which has a substantially shorter pot life.

The polyurethane can be cured with a compound having more than two active hydrogens per molecule. The resulting polyurethanes have thermosetting properties. Representative curing agents are polyols having at least three hydroxyl group; such as trimethylolpropane, trimethylolheptane, pentaerythritol and castor oil. Also suitable are mixed curing agents such as polyols having three hydroxyl groups in conjunction with a low molecular weight diol such as ethylene glycol or 1,4-butanediol. The polyols can also be mixed with polyamines having 2 or more reactive amine groups. Suitable polyamines are aromatic amines such as 4,4'-methylene-bis(2-chloroaniline) and diamino diphenyl sulfone.

Preferably, the polyurethane reaction is carried out in the presence of a catalyst. Catalysts have been found to give shorter cure times at lower temperatures and to insure complete reaction resulting in a cured polymer being essentially free of unreacted NCO groups. Suitable urethane-forming catalysts are those that are specific for the formation of the urethane structure by the reaction of the NCO group of the diisocyanate with the active hydrogen-containing compound and which have little tendency to induce side reactions. For these reasons, catalysts such as stannous salts of organic acids and organo tin compounds are preferred. Preferred catalysts include stannous octoate, stannous oleate, dibutyl tin diacetate, butyl stannoic acid and dibutyl tin dilaurate. The amount of catalyst used in any particular reaction mixture may be determined empirically and will be determined by the desired curing time and temperature. In general, amounts of from about 5 to 500 parts per weight of catalyst per million parts of polyurethane-forming ingredients are useful. Catalysts other than the preferred tin catalysts which are useful for the formation of urethanes may be also used, such as tetrabutyl titanate.

The polyurethane compositions of the invention can be prepared in several ways. The prepolymer method offers selective control of the polymerization steps. By this method, the long chain diol, such as the polyester diol, is first reacted with an excess of diisocyanate to give an intermediate molecular weight adduct or "prepolymer". The prepolymer can then be polymerized (chain extended) with glycols, diamines or other active hydrogen compounds.

In addition to the prepolymer route where the reaction of isocyanate with long chain diol is completed before the relatively low molecular weight active hydrogen compound, sometimes referred to as the curing agent, is added, all components may be mixed simultaneously in a so-called "one-step" or bulk polymerization process. This method is generally satisfactory when all active hydrogens react at about the same rate. However, when the active hydrogen compounds react at different rates, such as when the long chain diol and curing agent are of greatly different molecular weights, e.g. poly(1,4-butylene adipate) diol which has a molecular weight of 2500 and 1,4-butanediol which has a molecular weight of 90, a catalyst should be added to catalyze the reaction of the higher molecular weight compound. Particularly useful catalysts are the tin catalysts mentioned above such as dibutyl tin dilaurate, stannous octoate, and butyl stannoic acid.

For optimum results, the water content of the hydroxyl-terminated reactants should be as low as possible, and the isocyanate reaction should generally be conducted under anhydrous conditions with dry reactants, such as in a nitrogen atmosphere, at atmospheric pressure and at a temperature of between about 63° C. and about 100° C. The reaction is conducted until there are essentially no free isocyanate or hydroxyl groups, (i.e. less than about 8.6 percent and preferably less than 0.3 percent by weight NCO).

The processing conditions which may be used and the final polymer properties will also govern the choice of curing agent. When the prepolymer method is employed, the prepolymer is preferably heated to a temperature which will reduce the prepolymer viscosity to a few hundred or at most a few thousand centipoises to aid in mixing and which will prevent solidification of the curing agent if a solid curing agent is used. The curing agent is preferably heated above its melting point also. Mixing of the prepolymer with curing agent is a critical step and the agitation should be very thorough. Comparable polyurethanes may be obtained by the one-step polymerization method if the exotherm is properly controlled.

The ratio of reactants may vary depending upon the materials employed and the intended use of the urethane, but preferably the total number of active hydrogen atoms is approximately equivalent to the number of isocyanate group. The NCO to active hydrogen ratio is generally from between about 0.9 and about 1.1, preferably between about 0.97 and about 1.03.

The preferred polyurethanes of the invention generally have a number average molecular weight as estimated from inherent viscosity measurements between about 10,000 and about 100,000 and preferably between about 20,000 and 65,000. When a cast polyurethane interlayer sheet is fully cured, it is particularly useful laminated to a sheet of glass to form a safety glass article.

The present invention will be further understood from the description of specific examples which follows.

EXAMPLE I

For comparison with a polyurethane reaction mixture according to the present invention, a polyurethane reaction mixture is prepared as follows. One mole of a polycarbonate diol having a molecular weight of about 314 is placed in a vacuum oven at 180° F. (82° C.). The polycarbonate diol reactant contains about 400 to 600 parts per million of tetrabutyl titanate catalyst. One mole of 4,4'-methylene-bis(cyclohexyl isocyanate) is charged into a 500 milliliter reaction vessel and heated to 180° F. (82° C.) in a nitrogen atmosphere. The polycarbonate diol is then added to the reaction vessel with continuous stirring. The reaction mixture immediately begins to gel. The reaction proceeds extremely rapidly, exotherming to 248° F. (120° C.) in less than a minute. There is not sufficient time to cast the reaction mixture into a cell.

EXAMPLE II

For further comparison, the above reaction mixture is prepared at the lowest practical temperatures in order to retard the reaction. The diisocyanate is maintained at ambient temperature of 79° F. (26° C.). The polycarbonate diol is heated to a temperature of about 163° F. (73° C.) to provide a workable viscosity. As the polycarbonate diol is added to the diisocyanate, a violent reaction occurs. In 70 seconds the temperature reaches 302° F. (150° C.) and the reaction mixture is completely gelled.

EXAMPLE III

In accordance with the present invention, 0.1 gram of stearyl acid phosphate is dissolved in 48.2 grams of the diisocyanate of the previous examples, which is at a temperature of 163° F. (73° C.). The reactants are mixed for about 5 minutes to yield a clear, colorless, homogeneous liquid of moderate viscosity at a temperature of 156° F. (69° C.). After 25 minutes the temperature has decreased to 124° F. (51° C.) and the reaction mixture is still a clear, colorless, homogeneous viscous liquid.

From the above examples, it is seen that the addition of only about 0.1 percent by weight of an organic phosphorus acid compound increases the pot life of a polyurethane reaction mixture from about 1 minute or less to 25 minutes or more. This is sufficient time to cast the reaction mixture into molds to form useful articles. The cast reaction mixture undergoes a normal cure at typical curing temperatures. For example, at a cure temperature of 290° F. (143° C.), the polyurethane of the previous examples has a Shore A hardness at 290° F. of 25 after 40 minutes and 55 after 24 hours. When the polyurethane is cooled to room temperature, it has a Shore D hardness of 84. The above examples are offered to illustrate the present invention, the scope of which is defined by the following claims.

I claim:

1. A polyurethane reaction mixture consisting essentially of an organic polyisocyanate, a substantially equivalent amount of an organic compound having at least two isocyanate reactive hydrogen moieties, a tetrabutyl titanate catalyst, and a sufficient amount of an organic phosphorus acid compound to extend the pot life of said reaction mixture at typical processing and handling temperatures without substantially affecting its cure at higher temperatures.

2. The composition according to claim 1, wherein the organic polyisocyanate is an aliphatic diisocyanate.

3. The composition according to claim 2, wherein the organic compound having at least two isocyanate reactive hydrogen moieties is a polyol.

4. The composition according to claim 3, wherein the polyol comprises a diol selected from the group consisting of polyester, polycarbonate and polyether diols.

5. The composition according to claim 4, wherein the polyol further comprises a monomeric aliphatic diol.

6. The composition according to claim 1, wherein the organic phosphorus acid compound is a primary phosphate.

7. The composition according to claim 6, wherein the primary phosphate is stearyl acid phosphate.

8. The composition according to claim 7 wherein the amount of stearyl acid phosphate ranges from about 0.01 to about 0.5 percent of the weight of the isocyanate and isocyanate reactive components.

9. The composition according to claim 8, wherein the amount of stearyl acid phosphate is from about 0.05 to about 0.3 percent.

10. In a method for making polyurethane articles comprising reacting an organic polyisocyanate and an organic compound containing at least two isocyanate reactive hydrogens in a reaction mixture containing tetrabutyl titanate catalyst, the improvement which comprises adding to said reaction mixture an organic phosphorus compound in sufficient amount to extend the pot life of said reaction mixture at typical processing and handling temperatures without substantially affecting its cure at higher temperatures.

* * * * *